US006591227B2

(12) United States Patent
Koehler

(10) Patent No.: US 6,591,227 B2
(45) Date of Patent: Jul. 8, 2003

(54) TOOLING TRACKING SYSTEM FOR SHEET FED AND WEB FED PRESSES USING RADIO FREQUENCY IDENTIFICATION

(76) Inventor: David D. Koehler, 136 Summit Ave., Buffalo, NY (US) 14214

( * ) Notice: Subject to any disclaimer, the term of this patent is extended or adjusted under 35 U.S.C. 154(b) by 0 days.

(21) Appl. No.: 09/874,566

(22) Filed: Jun. 5, 2001

(65) Prior Publication Data

US 2002/0038198 A1 Mar. 28, 2002

Related U.S. Application Data

(60) Provisional application No. 60/209,484, filed on Jun. 5, 2000.

(51) Int. Cl.[7] .................................................. G06F 15/00

(52) U.S. Cl. ........................................... 702/183; 700/1

(58) Field of Search ............................ 702/183; 700/1; 340/526, 10.34; 100/902; 235/376

(56) References Cited

U.S. PATENT DOCUMENTS

| | | | | | |
|---|---|---|---|---|---|
| 4,142,238 | A | * | 2/1979 | Brandt et al. | 340/526 |
| 4,653,627 | A | * | 3/1987 | Hampson et al. | 100/902 |
| 4,742,470 | A | * | 5/1988 | Juengel | 340/10.34 |
| 6,148,239 | A | * | 11/2000 | Funk et al. | 700/1 |
| 6,330,971 | B1 | * | 12/2001 | Mabry et al. | 235/376 |

FOREIGN PATENT DOCUMENTS

| | | | | |
|---|---|---|---|---|
| EP | 476279 B1 | * | 2/1995 | B23Q/1/00 |

* cited by examiner

*Primary Examiner*—John Barlow
*Assistant Examiner*—Xiuquin Sun
(74) *Attorney, Agent, or Firm*—Brian B. Shaw, Esq.; Roger Aceto, Esq.; Harter, Secrest & Emery LLP

(57) ABSTRACT

An apparatus for assessing the operation of a machine as used by an operator with a given tool is disclosed. The present system includes a unique tracking tag associated with a given tool. An input device monitors use of the tool along with a given operator, wherein a cycle counter monitors use of the tool by the operator for an elapsed time. A processor/controller is employed to generate corresponding reports.

5 Claims, 2 Drawing Sheets

TOOLING TRACKING SYSTEM FOR SHEET FED AND WEB FED PRESSES USING RADIO FREQUENCY IDENTIFICATION

This Appln claims benefit of Prov. No. 60/209,484 filed Jun. 5, 2000.

FIELD OF THE INVENTION

The system provides useful information from tracking the design and usage of a box making tool on a box making press. The system provides a database of tool information, including tool design, press specifications, press speed, tooling usage. The database is updated as each tool is used. Reports based on information in the database can be generated at any time. The information can be used to evaluate the performance of the tooling, the capabilities of specific equipment to produce a design, the performance personnel, etc.

SUMMARY OF THE INVENTION

The present invention provides a system and method for monitoring the efficiency of a machine.

An apparatus for assessing operation by an operator of a machine employing a tool for forming a box design, comprising:

(a) a unique tracking tag associated with the tool;

(b) a data storage unit;

(c) an input to the data storage unit for entering an association of the tool with the machine;

(d) a cycle counter operably connected to the machine and the data storage unit to generate a signal corresponding to a number of cycles of the machine and an elapsed time for the number of cycles; and (e) a processor connected to the data storage unit, the processor configured to create a representation of a correspondence of the operator, the tool, the number of cycles, the elapsed time and the machine.

A method for assessing operation efficiency, comprising:

(a) assigning a unique tracking tag to a box-making tool;

(b) entering an operable association of the tagged box-making tool with a press, and an operator identifier;

(c) measuring a number of cycles/units produced by the press operably associated with the tagged box-making tool, including an elapsed time between the measured number of cycles; and (d) storing the operable association, the measured number of cycles, the elapsed time and the operator identifier, and a box design associated with the box making tool.

DETAILED DESCRIPTION OF THE PREFERRED EMBODIMENT

The present invention allows for assessing the performance of a machine employing a given tool 110, wherein the machine is operated by an operator. Specifically, it is anticipated the apparatus is directed to cutting a blank to form a box 132.

Figure 1:
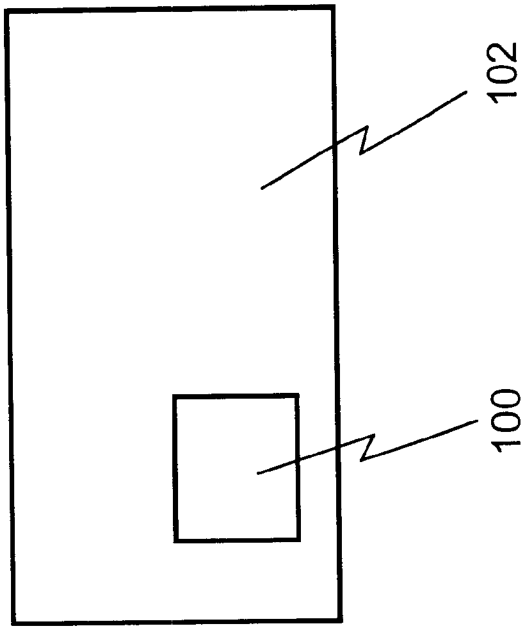
FIG. 1 schematically shows a tag embedded in a substrate.
Figure 4:
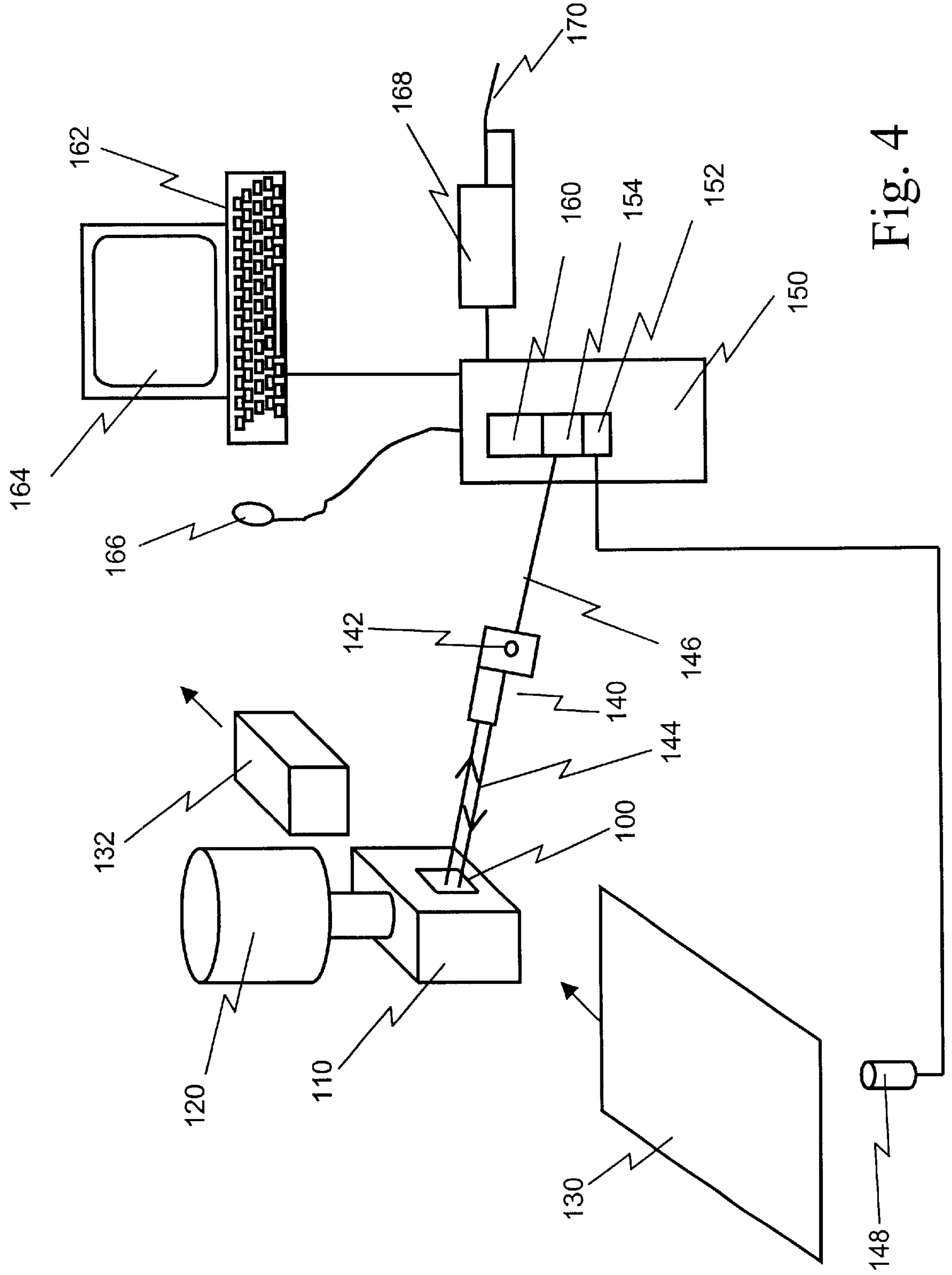

Referring to FIGS. 1 and 4, generally, the system includes a tracking tag 100, a data storage unit 154, an input to the data storage unit 154, a cycle counter 152 and a processor or controller 160. The tracking tag 100 is selected to be uniquely associated with a given tool such as a die or punch or press. Preferably, the tracking tag 100 is machine readable and can be detected without significant or with minimal operator input.

The data storage unit 154 can be any of a number of commercially available storage devices including computers and peripheral data storage components.

The input to the data storage unit 154 can include any of a variety of devices including key boards 162 as well as scanners 140 for entering an association of a given tool, and tracking tag 100, with a given machine 120.

The cycle counter 152 is a commercially available construction and operably connected to the machine 120 and the data storage unit 154 to generate a signal corresponding to the number of cycles of the machine 120. In a preferred configuration, the cycle counter 152 also captures an elapsed time for the monitored number of cycles.

The processor or controller 160, is connected to the data storage unit 154. The processor/controller 160 is configured to create a representation of the correspondence of the operator, the tool, the number of cycles, the elapsed time and the machine 120. The representation of the correspondence can take any of a variety of constructions or configurations including graphs, charts as well as raw numeric data.

Thus, the present invention provides a method of assessing operator and operation efficiency. Specifically, the method includes assigning a unique tracking tag 100 to a box making tool 110. The association of a tagged box making tool with a given press 120 and an operator identifier is entered, preferably into the controller/processor. Subsequently, the number of cycles and units produced by the press 120 and the associated operator and tool 110 are measured. The measurement includes an elapsed time for the measured number of cycles.

Figure 2:
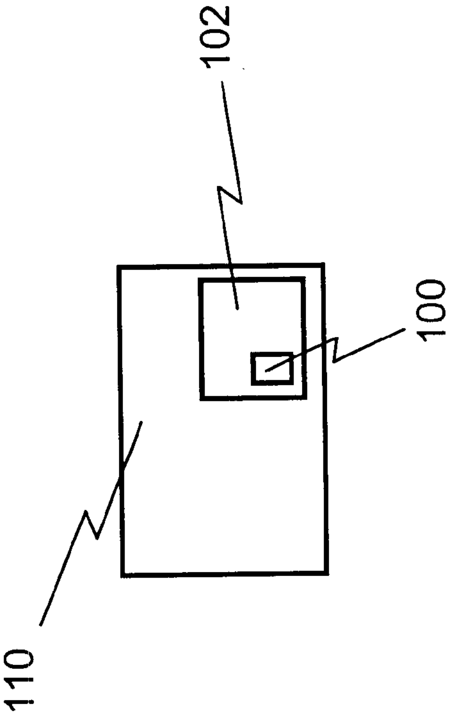
FIG. 2 schematically shows the substrate attached to a tool.
Figure 3:
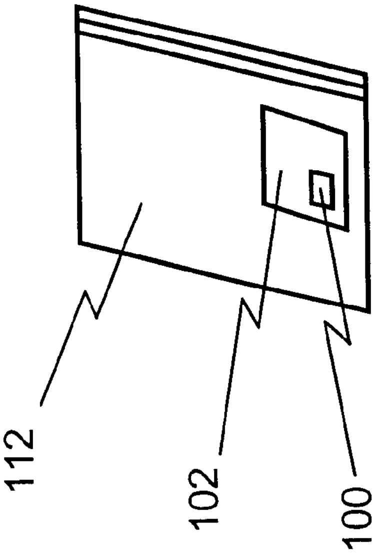
FIG. 3 schematically shows the substrate attached to a printed manual associated with the tool FIG. 4 schematically shows a system including the tagged tool, wherein information pertaining to the use of the tool can be tracked.

The tag 100 is preferably configured as a chip, which may include a substrate 102 such as an adhesive label or other means of attaching the tag 100 to the desired component, as in FIG. 2. Alternatively, the tag can be affixed as in FIG. 3 to a printed manual or specification document 112 or the like associated with the specific tool 100.

Further, the association of operator tool and press is stored along with the number of cycles, the elapsed time and the specific box design or tool. Subsequently, the stored data maybe prepared into the format of a chart or report.

System components include:

Desktop or similar computer capable of hosting and relational database.

Database and associated queries, and reports.

Hand held scanning wand/reader with 9 pin serial cable attached, made of shock resistant plastic. This is a 13.56 mhz transceiver that broadcasts a frequency up to 8" in distance and monitors for a change in the frequency that it registers as a signal from another device. The scanner 140 contains a push button 142 to actuate transmitted and received signals 144.

Software to transfer the hand held scanner signal to the computer 150 hosting the database. Other hardware includes a printer 168 for producing a report as a hard copy 170.

64 bit Programmable Read Only Memory chip (tag 100) that emits its unique signal when it becomes excited by a 13.56 mhz frequency. Before enclosure, the tag 100 is. 040" thickness by. 60" width by 0.60" length. It is enclosed in a PVC or epoxy case.

The hand held scanning wand/reader 140 with 9 pin serial cable 146 attached, is made of shock resistant plastic, and durable enough for factory floor operations. This is a 13.56 mhz transceiver that broadcasts a frequency up to 8" in distance and monitors for a change in the frequency that it registers as a signal from another device. The scanning wand/reader 140 contains a push button 142 to actuate the transmission and reception.

Data Storage Unit with the following specifications:

PLC board with battery backed RAM chips—capable of recording 5000 start and stop tag cycles, input relay for photo eye, and date module One 9 pin serial port for input from the tag reader One 9 pin serial port for output 8 inputs and 6 outputs for the photo eye Indicator lights to display when unit can accept signal and when signal is registered Manual override switch Connector and wiring for the Machine Open Signal from the press enclosed in a NEMA 12 rated steel case. Power of 120 vac@3 amps for the unit Photo cell reflector and connector for counting sheets as they are fed into the press.

Database table residing in PLC for recording the start and end times, tool usage, and tag number.

System Operations:

A tracking tag 100, assigned a unique number, is attached to a box making tool or the tool's factory specification document. It can be attached when the tool is new, partially worn, or revised. The tag 100 performance is unaffected by printing inks, cleaning solvents, magnetic forces, electrical fields, and abrasive conditions typical in converting press operations.

The tooling design specifications and the tooling condition are manually entered into a database and assigned the unique number of the tracking tag 100.

Before mounting the tooling 110 on the box making press 120, the press operator scans the tag(s) 100 with the hand held reader, or permanently attached antenna. Multiple pieces of tooling may be used simultaneously on the press and tracked through their individual tags 100.

Tool usage is recorded as the press is used. A photo eye 148 attached to the existing press will be triggered as each sheet of box material 130 is fed into or ejected from the press. Each sheet of box material 130 traveling through the press constitutes one unit of usage. The photo eye sends a signal to the data storage device each time a sheet of box material passes through the press. The time that the first sheet signal is registered is recorded and the time that the last sheet signal is registered is recorded.

The number of sheets and the time period of use, and therefore the tooling usage during that period of time, will be stored in database format in the data. storage unit.

Data will then be transferred to a remote computer via a serial cable connected to the data storage unit.

The tooling usage data along with its unique tag number is transferred into the database containing the corresponding unique tag number and the tooling design and condition information.

The present system is not a natural progression of existing technology as:

(a) the present reports are used by the box making plant to understand the performance of the press equipment and personnel when making different types of boxes (the end product from their presses). The present system also allows the monitoring of where and when a tool was used.

(b) Existing tooling tracking systems function for the purpose of telling a user about where and when a tool was used. They do not have a reporting feature to correlate the tool usage to the performance of the equipment and personnel in making the end product.

(c) Box making plants have no classification and data collection systems that match tooling design and equipment and personnel performance in an efficient and reliable manner.

RPM by Design and EZ Link Tooling System by Koehler-Gibson

Press and Shift

| Design Type | Press | Shift | Mean Average RPM | Minimum RPM | Maximum RPM |
|---|---|---|---|---|---|
| Autolock Btm | Langston | 1 | 158 | 133 | 182 |
| Autolock Btm | Ward | 1 | 95 | 75 | 110 |
| Autolock Btm | Ward | 2 | 76 | 54 | 100 |
| Autolock Btm | Ward | 3 | 67 | 67 | 67 |
| Roll End Tray | Ward | 1 | 71 | 71 | 71 |
| Roll End Tray | Ward | 2 | 50 | 50 | 50 |
| RSC | Langston | 1 | 143 | 143 | 143 |
| RSC | Langston | 2 | 44 | 44 | 44 |
| RSC | Ward | 1 | 96 | 71 | 125 |
| Large Line Art | Flexo 50 | 1 | 75 | 50 | 100 |
| Large Line Art | Flexo 50 | 2 | 83 | 83 | 83 |
| Large Line Art | Flexo 50 | 3 | 80 | 60 | 100 |
| Large Line Art | Ward | 1 | 106 | 61 | 167 |
| Large Line Art | Ward | 2 | 76 | 63 | 89 |
| Large Solid w/Reverses | Flexo 50 | 1 | 100 | 100 | 100 |
| Large Solid w/Reverses | Flexo 50 | 2 | 119 | 119 | 119 |

Tool Life—Average Cycles by Design EZ Link Tooling System by Koehler-Gibson

| Design Type | Average Cycles |
|---|---|
| Autolock Btm | 10850 |
| Large Line Art | 7667 |
| Large Solid w/Reverses | 5000 |
| Roll End Tray | 1000 |
| RSC | 7125 |

RPM by Design EZ Link Tooling System by Koehler-Gibson

| Design Type | Mean Average RPM | Minimum RPM | Maximum RPM |
|---|---|---|---|
| Autolock Btm | 99 | 54 | 182 |
| Roll End Tray | 61 | 50 | 71 |
| RSC | 95 | 44 | 143 |
| Large Line Art | 88 | 50 | 167 |
| Large Solid w/Reverses | 110 | 110 | 119 |

RPM by Design EZ Link Tooling System by Koehler-Gibson

| Design Type | Press | Mean Average RPM | Minimum RPM | Maximum RPM |
|---|---|---|---|---|
| Autolock Btm | Langston | 158 | 133 | 182 |
| Autolock Btm | Ward | 83 | 54 | 110 |
| Roll End Tray | Ward | 61 | 50 | 71 |
| RSC | Langston | 94 | 44 | 143 |
| RSC | Ward | 96 | 71 | 125 |
| Large Line Art | Flexo 50 | 79 | 50 | 100 |
| Large Line Art | Ward | 96 | 61 | 167 |
| Large Solid w/Reverses | Flexo 50 | 110 | 100 | 119 |

Reports are generated that quantify various performance attributes of the tooling. These attributes consist of various combinations of information including, but not limited to the following:

Tooling material composition

Box design associated with the tooling

Total usage of the tooling

Tooling speeds on press

Differences in usage between presses

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. An apparatus for assessing operation of a box forming machine as used by an operator with a given tool for forming a box design, comprising:

(a) a unique tracking tag associated with the tool;

(b) a data storage unit containing accessible inputted information concerning the tool, the inputted information being associated to the tracking tag;

(c) means for entering inputs to the data storage unit to identify the operator, the box design and the association of the tool with the machine;

(d) a cycle counter operably connected to the machine and the data storage unit to generate a signal corresponding to a number of box forming cycles of the machine and an elapsed time for the number of cycles; and (e) a processor connected to the data storage unit, the processor configured to process the inputs including the box design, the machine used, the operator of the machine, the given tool, the number of box forming cycles and the elapsed time to create a representation of a correspondence of the inputs.

2. The apparatus of claim 1, wherein the means includes a transceiver.

3. The apparatus of claim 1, wherein the cycle counter includes a photo eye.

4. The apparatus of claim 1, wherein the tracking tag is a read only memory chip.

5. A method for assessing operation efficiency, comprising:

(b) assigning a unique tracking tag to a box-making tool;

(b) entering an operable association of the tagged box-making tool with a press, and an operator identifier;

(c) measuring a number of cycles/units produced by the press operably associated with the tagged box-making tool, including an elapsed time between the measured number of cycles; and (d) storing the operable association, the measured number of cycles, the elapsed time and the operator identifier, and a box design associated with the box making tool.

* * * * *

UNITED STATES PATENT AND TRADEMARK OFFICE

CERTIFICATE OF CORRECTION

PATENT NO. : 6,591,227 B2 
DATED : July 1, 2003
INVENTOR(S) : Koehler, David D.

It is certified that error appears in the above-identified patent and that said Letters Patent is hereby corrected as shown below:

<u>Column 6,</u>
Line 36, insert -- (e) generating a report from the stored process data to provide a representation of the correspondence of the stored data. --

Signed and Sealed this

Twenty-first Day of October, 2003

JAMES E. ROGAN
*Director of the United States Patent and Trademark Office*